United States Patent [19]

Cuevas

[11] Patent Number: 4,865,635
[45] Date of Patent: Sep. 12, 1989

[54] FILTER ASSEMBLY FOR NON-WELDED INFLATOR DEVICE

[75] Inventor: Jess Cuevas, Scottsdale, Ariz.

[73] Assignee: Talley Automotive Products, Inc., Mesa, Ariz.

[21] Appl. No.: 233,194

[22] Filed: Aug. 17, 1988

[51] Int. Cl.⁴ .......................................... B01D 46/00
[52] U.S. Cl. .................... 55/276; 55/485; 55/487; 55/510; 55/523; 29/419.2; 29/510
[58] Field of Search ............... 55/276, 485, 486, 487, 55/510, 517, 523; 29/419.2, 510

[56] References Cited

U.S. PATENT DOCUMENTS

| | | | |
|---|---|---|---|
| 2,976,907 | 3/1961 | Harvey et al. | 153/10 |
| 3,411,808 | 11/1968 | Chute | 280/150 |
| 3,413,013 | 11/1968 | Wissing et al. | 280/150 |
| 3,770,387 | 11/1973 | Loomba | 23/281 |
| 3,880,447 | 4/1975 | Thorn et al. | 280/150 |
| 3,887,215 | 6/1975 | Albrecht et al. | 280/150 |
| 3,907,330 | 9/1975 | Kondo et al. | 280/150 |
| 4,068,862 | 1/1978 | Ishi et al. | 280/740 |
| 4,131,299 | 12/1978 | Ono et al. | 280/736 |
| 4,296,084 | 10/1981 | Adams et al. | 423/351 |
| 4,382,440 | 5/1983 | Kapp et al. | 55/486 X |
| 4,547,342 | 10/1985 | Adams et al. | 422/166 |
| 4,561,675 | 12/1985 | Adams et al. | 280/734 |
| 4,711,466 | 12/1987 | Breed | 280/741 |
| 4,722,551 | 2/1988 | Adams | 280/736 |

*Primary Examiner*—Charles Hart
*Attorney, Agent, or Firm*—Pennie & Edmonds

[57] ABSTRACT

A self-sealing annular filter component for operation within a housing portion of a pyrotechnic inflator device. The filter comprises: (a) first and second ring-shaped members configured to form an annular frame, at least one of the ring members being provided with at least one tab member formed integrally therewith and extending outwardly therefrom toward the other ring-shaped member to maintain a set spacing between the frame members, and (b) a plurality of filter layers supported upon the filter frame, each filter layer positioned so as to at least partially overlap a preceding underlying filter layer around the entire annular surface of the filter frame. The outer circumferential edge of the ring-shaped frame member is adapted to ensure circular line contact with an inner portion of the inflator housing. This causes the filter to be self-sealing against the housing as a result of outwardly directed hoop stresses produced by activation of the inflator and thus ensures that the gaseous combustion products produced as a result of the inflator firing do not bypass the filter and exit directly into an attached air bag.

17 Claims, 4 Drawing Sheets

FILTER ASSEMBLY FOR NON-WELDED INFLATOR DEVICE

TECHNICAL FIELD

The invention relates to automobile passive restraint safety devices and, more particularly, to a filter assembly for use with a lightweight, non-welded pyrotechnic gas generator unit for inflating automobile air bags.

BACKGROUND OF THE INVENTION

Large numbers of people are killed or injured annually in automobile accidents wherein the driver and/or passengers are thrown forward so as to impact against solid surfaces within the vehicle. There has thus been considerable impetus toward development of passive restraint systems for use with these vehicles. One system which has been extensively investigated senses rapid deceleration of the vehicle such as that which occurs upon a primary impact between an automobile and, for example, another car. It thus initiates inflation of a bag between the interior surface of the car and the vehicle occupant prior to the occurrence of any secondary collision between the driver and/or passengers and the interior of the car. Inflation of the bag must therefore occur within milliseconds of the primary impact in order to restrain any occupants before they are injured due to secondary collisions against the solid surfaces within the vehicle.

Moreover, it is desirable to deflate the bag as soon as the impact of a crash is completed, so that the occupant is not trapped within the vehicle by an inflated bag. It is also desirable to deflate the bag rapidly so that, in case of accidental inflation, the restraint upon the person driving the automobile is sufficiently short that they do not lose control of the vehicle. In order to meet such criteria, specifications have been established whereby a bag should be inflated sufficiently to restrain an occupant in about 30-60 milliseconds after initiation, with substantial deflation occuring after about 100 milliseconds.

One of the problems with providing such a passive restraint system for protecting the driver of the automobile during a crash is how to arrange and position the device upon the steering column. For reasons of styling and consumer acceptance, as well as not interfering with the driver's movement or vision of the instrument panel, and so as not to degrade the vehicle's steering dynamics, it is desirable to arrange the crash restraint apparatus as conveniently as possible, and yet have it positioned so that it effectively accomplishes its intended protective function. Further, since an inflating device for such a crash restraint system must be capable of discharging a relatively large volume of gas in a very short period of time (e.g., 30-60 milliseconds), there are safety considerations not only in the deployment of the inflator within the automobile, but also with regard to handling, installing, replacing and repairing such inflating devices.

In addition, in the particular case of a driver's side, i.e., steering wheel, installation, the utilization of an inflator apparatus with a low weight is important for several reasons. First, the wheel assembly is in a cantilevered position at the end of the steering column. Therefore, excessive weight upon the wheel assembly can cause excessive column whip attributable to vertical accelerations due to road shocks (e.g., bumps or chuckholes) which can lead to degraded if not loss of driver control. Secondly, if for reasons such as styling or driver vision line clearance, the inflator is required to be located asymmetrically with respect to the steering column centerline, any excessive weight attributable to this device will create resistive wheel turning torque, thus degrading the rotational dynamics of the steering assembly and providing potential for loss of driver control or other unusual or undesirable vehicle handling "feel" under certain driving conditions.

The recent emphasis on weight reduction for the purpose of fuel conservation in motorized vehicles, has thus created a need and a demand for a lighter weight inflation system. This is of particular importance in a crash protection system for the driver wherein the inflator is mounted on the vehicle's steering wheel. The availability of a lighter weight inflator for installation at this location further enables a reduction to be made in the weight of the vehicle's steering wheel and the steering column on which the inflator is mounted, providing a concurrent improvement in the "steerability" of the automobile.

In this regard, some recently introduced inflator devices utilize aluminum casing materials. The use of lighter materials such as aluminum in the construction of automobile air bag inflators, however, creates certain difficulties in that techniques need to be developed for rapidly connecting components formed of this material together in such a way as to ensure the formation of a structural seal therebetween, even while the generator is pressurized during the inflation cycle.

As noted above, there are in the prior art various devices which cause a protective bag to inflate in front of an automobile driver or passenger to cushion the impact with the steering wheel, dashboard or other interior vehicle surface. Usually the device is activated by an inertial switch responsive to a primary crash impact. This inertial switch in turn causes an inflator apparatus to quickly inflate a collapsed bag into a protective position in front of the driver or passenger.

The inflating gas is generally supplied either from a source of compressed air or other compressed gas, such as shown in Chute, U.S. Pat. No. 3,411,808 and Wissing et al., U.S. Pat. No. 3,413,013, and a number of other patents in the crash restraint field. In several other prior art patents (e.g., U.S. Pat. Nos. 3,880,447 to Thorn et al.; 4,068,862 to Ishi et al.; 4,711,466 to Breed; and 4,547,342; 4,561,675 and 4,722,551 to Adams et al.), the bag is inflated by igniting a pyrotechnic propellant composition and directing the gaseous combustion products produced thereby directly into the bag.

The first technique discussed above for inflating an air bag requires a reservoir of gas stored at a very high pressure, which may be discharged into the bag as soon as an impact is sensed. In order to obtain a sufficient volume of gas for inflating a vehicle occupant restraint bag, however, a relatively large reservoir of gas, at pressures of 3000 psi or more is required. To open the gas reservoir in the very short time interval required for ensuring the safety of the vehicle occupants, explosive arrangements have been employed in the prior art for bursting a diaphragm or cutting through a structural portion of the reservoir. Such explosive arrangements have significant inherent safety problems, such as the production of shrapnel by the explosion, as well as the relatively high sound level reached within the passenger compartment due to the explosion. The psychological factor of having these explosives in each automobile also cannot be ignored.

The gas bottle (i.e., reservoir) technique for inflating an air bag also suffers from an additional disadvantage in that the gas pressure is highest at the commencement of bag deployment and decreases as a function of time as the gas in the storage reservoir is depleted. Moreover, the pressure/time history of such pressurized gas inflator devices is difficult if not impossible to control at reasonable cost and reliability. Further, the pressurized gas technique is undesirable since a minor leak can result in all of the gas being lost during the long period that the passenger restraint system must remain in the automobile prior to any crash.

In addition, the adiabatic cooling of the gas as it expands from a storage condition of elevated pressure to the nearly ambient pressure of the inflatable bag reduces the effective volume of the gas available for inflating the bag. This cooling effect thus requires the manufacturer of the device to provide a total gas storage volume significantly greater than if the gas was initially stored at an elevated temperature.

The second technique discussed above employs a pyrotechnic gas generator having a rapidly burning propellant composition stored therein for producing substantial volumes of hot gaseous products which are then directed into the inflatable bag. Some compositions are available which produce a sufficiently low temperature combustion gas such that the gas may be directed substantially directly into the bag without danger to the vehicle's occupants. Other systems produce a high temperature combustion product requiring means for cooling the gas before it is introduced into the bag.

Many forms of gas generators or inflators utilizing combustible solid fuel gas generating compositions for the inflation of crash protection, i.e., "air bag", restraint systems are known in the prior art. Commonly encountered features among generators utilized for this purpose include: (1) an outer metal housing, (2) a gas generant composition located within the housing, (3) means to ignite the gas generant responsive to a signal received from a sensor positioned at a location removed from the inflator, and (4) means to filter and to cool the gas, positioned between the propellant composition and a plurality of gas discharge orifices defined by the generator housing.

One such gas generator includes an annular combustion chamber which is bounded by a welded outer casing or housing structure. The combustion chamber encloses a rupturable container or cartridge that is hermetically sealed and which contains a solid gas generant in pelletized form, surrounded by an annular filter assembly. The device further includes a central ignition or initiator zone and a toroidal filter chamber adjoining and encircling the combustion chamber. An inner casing or housing structure is located in close surrounding and supporting relationship to the rupturable container, the inner casing being formed by a cylinder having uniformly spaced peripheral ports or orifices near one end. These orifices provide exit holes to facilitate the flow of gas from the combustion chamber.

Alternately, inflator devices are constructed comprising first and second structural components or shells specifically, a first diffuser shell and a second base shell. Both shells are forged and heat treated, after which they undergo machining to obtain a proper fit therebetween. The first structural component, i.e., the diffuser shell, comprises three integral concentric cylinders. These cylinders form the inner structural walls of the inflator and define chambers therein containing the solid gas generant, the ignition means, and the filter assembly. The cylinder walls further define exit openings or ports for the passage of the gases between adjacent chambers and subsequently out of the inflator and into the protective air bag.

The second structural component, i.e., the base shell, is equipped with an initiator device, i.e., an electrical squib, for igniting the main propellant charge. A flange is provided around the outer periphery of the base shell for attaching an air bag thereto. The base shell additionally comprises three concentric mating surfaces corresponding to the concentric cylinders of the diffuser shell. The three concentric cylinders of the diffuser shell are thus mated to corresponding concentric mating surfaces located upon the base shell by a process such as inertia welding.

As noted above, gas filtration systems are normally utilized with generators of the type described above, to cool the gas and to remove particulate products produced as a result of the combustion of the pyrotechnic material. Filters included in prior art gas generators of the type described above ordinarily comprise a series of zones or chambers containing layers of metal screen material having a variety of mesh sizes and/or one or more layers of an inert fiber. These filter components are typically separated from the central combustion chamber by thick support walls, which are required in this type of generator construction to withstand the elevated pressures produced during the ignition and combustion of the gas generant. A plurality of openings or ports are provided in these walls, through which the gas must pass in order to reach the filtration zone. Moreover, some sort of clip or pedestal arrangement within the filtration zone is normally required to maintain the plurality of screens, pads, etc. in proper position and alignment.

Gas generators must withstand enormous thermal and mechanical stresses for a short period during the gas generation process. Thus, inflators that have been and are currently being used with automobile air bag devices have been fabricated using heavy gauge steel for the casing and other structural housing components, with these components being joined together by, for example, screw threads, roll crimping or welding. More specifically, each of the gas generator units presently in commercial production is assembled and sealed with, for example, the use of some form of welding technique, such as inertia welding or electron beam welding.

SUMMARY OF THE INVENTION

It is thus an object of the present invention to provide a simple, easily installed filter assembly component for use in a lightweight, non-welded inflator portion of an automobile passive safety device which is capable of generating a sufficient amount of a gaseous combustion product to substantially inflate an automobile air bag in about 30–60 milliseconds.

It is a further object of the invention to provide a filter assembly component which serves a dual role within the inflator in that it not only filters the gaseous combustion product produced as the pyrotechnic gas generating material is burned, but also defines the outer boundary of the combustion chamber within the inflator housing.

It is another object of the invention to provide a filter assembly component capable of cooling the gaseous combustion products produced by the inflator to a temperature approaching ambient prior to their entry into an automobile air bag operatively associated with the inflator device, while removing substantially all of the particulate material therefrom as well.

It is a still further object of the invention to provide a filter assembly component for use with an air bag inflator device, which is capable of forming a gas-tight seal against an interior portion of the inflator housing in which it is installed as a result of outward hoop stresses created within the filter when the inflator is fired.

The filter assembly component of the present invention thus serves not only to filter the gaseous combustion products produced as a result of the ignition of a propellant charge within an automobile air bag inflator device, but also, the inner wall of the filter unit, i.e., the side circumjacent the pyrotechnic propellant composition within the inflator housing, serves to define the outer limit of the combustion chamber.

Thus, in constructing a lightweight, non-welded inflator device of the type intended for use with the subject filter assembly, the filter assembly is simply lowered into an open end of a domed diffuser member, whereupon the propellant is lowered into the combustion cavity formed by the annular filter ring. A closure plate is then mated to the open end of the diffuser member and the unit is mechanically sealed, preferably by magnaforming the lower lip of the diffuser member over the outer edge of the closure plate member.

In contrast to other commercially available inflator units wherein the filtration of the gaseous combustion product occurs in a separate compartment or annular "zone", the filter assembly unit of the present invention thus actually forms a portion of the combustion chamber within the inflator as noted above, obviating the need for additional weight-adding partitions or structural walls, having apertures through which the gas must be squeezed to reach the filter assembly.

The filter assembly component of the present invention is comprised of two annular, i.e., ring-shaped, sheet metal stampings, adapted so that a first, inner ring is partially overlapped by a second, outer ring. The outer ring member is provided with several tab members formed integrally therewith and extending outwardly therefrom to maintain a set spacing between the two annular components. To provide a tortuous gas flow path through the various layers of the filter assembly, a number of slotted apertures extend through the filter assembly. This serpentine gas path acts to both cool the gas to a temperature approaching ambient and to remove substantially all of the particulates therefrom. These features are of particular importance since, if hot gases and/or molten particulates are permitted to impinge on an interior surface of the air bag during its deployment, the bag may be burned through as a result, leading to a catastrophic failure of the safety system of which it forms a part.

A number of overlapping filtration layers, comprising a series of metal screens of varying mesh size and one or more pads formed from inert ceramic fibers, are circumferentially overlapped, one atop the next, between the first and second ring-shaped members which form the frame of the filter. Thus, viewing the filter from the first, inner frame member (i.e., adjacent the combustion cavity) and traveling in the direction taken by the gaseous combustion products, i.e., toward the second, outer frame member, the gas passes over the inner ring member, through a double layer of a "slag" filter comprising a coarse, e.g., 14 mesh, screen material, around a flanged portion of the filter frame, through a second double layer of "slag screen", between two corresponding flanged portions of the first and second annular filter members, through a fine (100 micron) screen, then through a pad formed of inert ceramic fibers, such as Fiberfrax ®, through a second 100 micron screen and thereafter through a double layer of a 28 mesh screen which lies adjacent the inner wall of the inflator housing, abutting a plurality of inflator ports evenly spaced along the circumferential peripheral surface of the diffuser, through which the gas exits the inflator. The filter assembly unit is held together by welding the outer 28 mesh layer to the surrounding annular flame members at the outer periphery of the unit.

Another important feature of the present filter component is that the sheet metal stampings which form the inner and outer annular frame members of the assembly are configured to extend outwardly along their upper and lower circumferential surfaces at an angle of $1\frac{1}{2}°$ (on each surface) greater than the internal contact angle between the diffuser and the closure plate member, respectively, which form the inflator housing, so as to provide circulr line contact within the inflator housing entirely around the filter unit. This creates a "wedge" effect between the filter assembly unit and the adjacent inflator housing member.

Therefore, when the filtration unit is subjected to outward hoop stresses produced during combustion of a pyrotechnic composition within the combustion cavity, the filter is forced outwardly so as to wedge against the diffuser and the closure plate member. This, in turn, forms a gas-tight seal between the filter assembly and the inner wall of the inflator housing, thus ensuring that the gas is directed through the filter prior to exiting the inflator. Thus, there is no means by which the gas may bypass the filter and exit the inflator directly from the combustion chamber. The filter assembly therefore acts as a self-sealing unit when utilized as a component of the gas inflator unit.

DETAILED DESCRIPTION OF THE PREFERRED EMBODIMENTS

Figure 1:
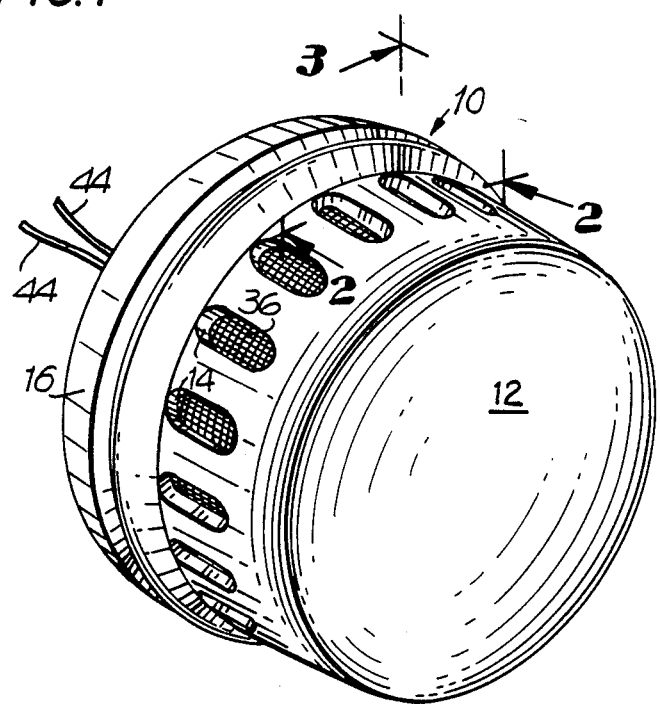
FIG. 1 is a perspective view of a gas generator apparatus constructed according to the present invention.

Referring initially to FIG. 1 there is illustrated applicant's air bag inflator apparatus 10. Inflator 10 is comprised of six main components, designed and adapted for simple robotic assembly. These components include: (a) a domed diffuser member, which is open at one end; (b) a closure member to seal the open end of the diffuser, thus forming the inflator housing; (c) a measured quantity of a pyrotechnic propellant composition placed within the housing; (d) a filter assembly located within the housing, outwardly adjacent the propellant, for cooling and filtering the gaseous products produced by the combustion of the propellant; (e) an igniter apparatus to initiate combustion of the propellant, and (f) a ring shaped member circumjacent to a portion of the diffuser which overlaps the closure member to assist in forming a hermetic seal between these components during the assembly thereof. The function of each segment (a–f) of inflator 10 is described in detail below.

As shown in FIG. 1, the housing of inflator 10 is fabricated in the form of a domed pressure vessel, since this design is well known as providing the optimum shape for containing a pressurized atmosphere, such as that which is produced when the propellant within inflator 10 is ignited. Moreover, the domed shape permits the use of an inflator having a smaller diameter than heretofore considered possible, without a concurrent need to thicken the inner support walls of the device, thus also providing an apparatus having a lower weight than those currently available.

More specifically, FIG. 1 illustrates diffuser 12 which forms a first (upper) portion of the inflator housing. Diffuser 12 is closed at one end by a domed roof portion as discussed above. The circumferential walls of this component further define a plurality of diffuser ports 14. Ports 14 are thus spaced equidistantly around the wall portions defining the peripheral circumferential boundary of diffuser 12. Each of diffuser ports 14 communicates through the diffuser wall with the combustion chamber located within the inflator housing through an abutting annular filter assembly (discussed below) interposed therebetween.

One advantage of the present inflator configuration over existing inflators is in its simplicity of construction and ease of assembly. The filter assembly is simply lowered into position within diffuser 12, after which the propellant is lowered into the filter cavity, whereupon the closure member (not shown) is lowered and mated to diffuser 12 by forming the diffuser lip thereover (see, e.g., FIG. 3) utilizing a technique known as magnaforming, which is described below in detail.

The diffuser/closure assembly process is carried out in the prior art by welding these two components together as discussed above. This practice, however, necessitates the inclusion of thick (i.e., heavy) walls or support members in the interior of the generator housing, which are unnecessary in the present device; as well as requiring a costly, time-consuming inspection of every weld. This weld inspection step requires an expensive x-ray inspection device and a trained operator to carry out these inspections. Thus, the process preferred by applicant for sealing the present inflator 10 utilizes a procedure known as a magnaforming, such as that described in U.S. Pat. No. 2,976,907 to Harvey et al., (the "'907 patent") the disclosure of which is expressly incorporated herein by reference.

Applicant has further determined that the best results are obtained with the subject magnaforming technique when the temper of the metal of which the components of inflator 10 are formed is as high as possible without being such that the metal cracks during the magnaforming process due to excessive brittleness. This ensures that inflator 10 can be constructed of lightweight materials (such as aluminum) while still maintaining a sufficient degree of structural strength to withstand the forces generated within the unit during the combustion of the propellant.

By the use of a magnaforming process such as that described in the '907 patent, a variable magnetic field is created adjacent the work piece, i.e., in the area where diffuser 12 and closure member (not shown) overlap. Subsequently, one or more force impulses set up by the magnetic field are directed against the lower lip of diffuser 12, which is oriented at a first position diverging outwardly, i.e., away from, the peripheral edges of the closure member. The effect of these force impulses is to smoothly force the diffuser lip inwardly over the edge of the closure member to a second position at an angle of substantially 180° with the remainder of the circumferential wall of diffuser 12 without the need for physically contacting the diffuser lip with any mechanical device. This procedure creates a hermetic compression seal between diffuser 12 and the underlying closure member. Thus, no welds are necessary to assemble inflator 10, since the magnaforming process is both faster and more reliable than the previously practiced welding procedure.

In the particular magnaforming technique preferred by the applicant, drive ring 16 is utilized to enhance the effect of the force impulses in sealing the two inflator components. Ring 16 is preferably formed out of the same material used to fabricate the inflator housing, i.e., aluminum, although other strong but lightweight materials may be substituted for the aluminum used to form inflator 10, such as 301 stainless steel or titanium. The drive ring 16 is initially slipped over the domed end of inflator 10 and permitted to slide downwardly toward the open end thereof to the point where the wide lower lip of diffuser 12 prevents any further downward motion.

As the magnetic field produced by the magnaforming apparatus (not shown) surrounds these components, drive ring 16 is collapsed inwardly, causing the metal lip of diffuser 12 to flow over and seal against the peripheral edge of the closure member in the area where their surfaces overlap. Thus, the use of driver ring 16 in the magnaforming process used to form the inflator housing serves to enhance and direct the effect of the energy pulse and adds strength to the bond formed between the two pieces of metal, i.e., diffuser 12 and the closure member. Ring 16 serves to even out the amount of energy directed at any one location, thus permitting a tighter seal requiring less energy to produce.

Thus, as noted above, the advantage of applicant's use of the magnaforming process to seal the components of inflator 10 lies in the speed with which this assembly can now be completed, i.e., in seconds instead of minutes, in contrast to the tedious and expensive welding techniques relied upon in the prior art. As disclosed in the '907 patent, however, the technique of magnaforming is well known in the prior art and is not claimed as having been developed by the applicant.

A weld inspection step, required for all gas inflators currently manufactured and requiring expensive, difficult to operate equipment, is now also obviated by applicant's use of the magnaforming technique as disclosed herein, since the effectiveness of applicant's magnaforming operation can be much more easily determined without x-raying inflator 10, by simply calculating the dimensions of the completed unit to determine whether they fall within predefined ranges.

In addition, with the use of the presently described assembly process for forming inflator 10, there is no longer any necessity to utilize a back-up method for sealing the inflator, such as, by crimping or riveting the diffuser and the closure, i.e., methods which have been relied upon in the past. This provides a further saving in both time and energy as well as in parts costs. Moreover, the application of the presently described process permits the use of inexpensive forged metal parts rather than more expensive machined components for both diffuser 12 and the closure member.

Figure 2:
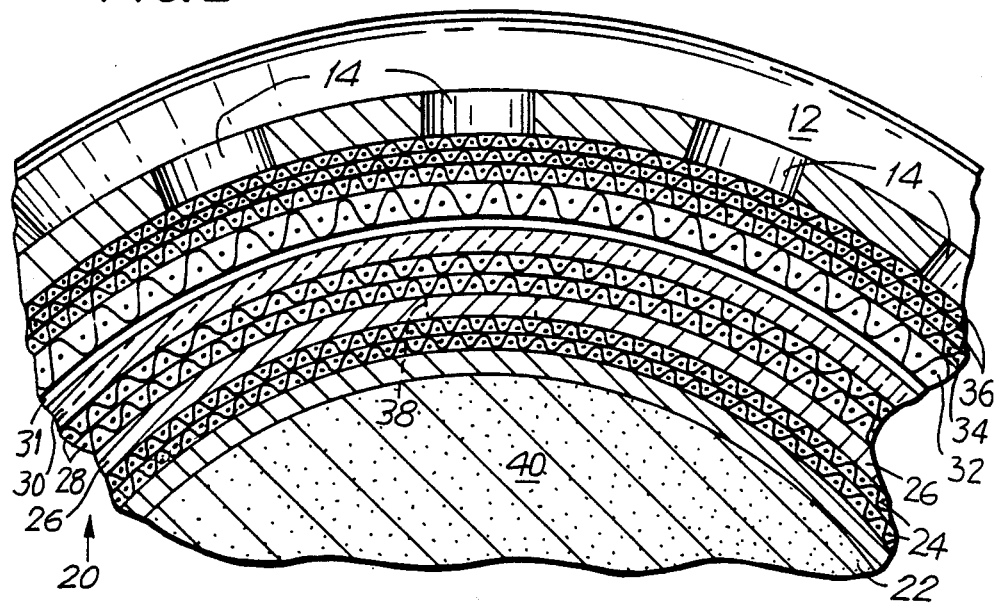
FIG. 2 is a sectional view taken along the line 2—2 of FIG. 1.

Turning now to FIG. 2 there is illustrated a cross-sectional view taken through diffuser ports 14 and showing the various layers which comprise filter assembly 20. These layers comprise, starting from the side adjacent the propellant compartment, a first frame member portion 22; two layers of a coarse "slag screen" material 24, preferably of 14 mesh (i.e., 1400 micron) screen; a second frame member portion 26; two additional layers of "slag" screen 28; a third frame member portion 30; a layer of a fine 100 micron screen 31; a layer of an inert ceramic fiber pad 32, such as Fiberfrax ®, (i.e., a mixture of aluminum oxide and silica oxide, sold by Sohio Carborundum, Inc. of Niagra Falls, N.Y., a division of the Standard Oil Co.); a second layer of screen 34 having a mesh size of 100 microns and finally, a double layer 36 of a very fine mesh screen, i.e., 28 mesh, which abuts the inner surfaces of diffuser port 14. Tabs 38 (one of which is shown in phantom), which are preferably four in number, serve to maintain the required separation between the filter frame members (see, e.g., FIG. 8).

Within the interior portion of the generator, adjacent filter assembly 20, is the propellant cavity which contains a measured amount of pyrotechnic gas-generating composition 40.

Filter assembly 20 is provided to cool the gas created by the combustion of propellant 40 in the propellant cavity as it travels a tortuous path through the various layers of screen material and ceramic fibers and to prevent the passage therethrough of particulate reaction products formed during combustion of pyrotechnic composition 40. The mesh sizes of the screen layers thus become progressively smaller, as illustrated in FIG. 2, as the gas traverses filter 20 from the propellant cavity toward diffuser ports 14. This serves to ensure that hot particulate materials do not exit inflator 10 during the gas-generating stage and impinge upon the inner surface of the bag (not shown) thus damaging the effectiveness of the passive restraint and creating the opportunity for injury to the vehicle's driver and/or passenger.

Figure 3:
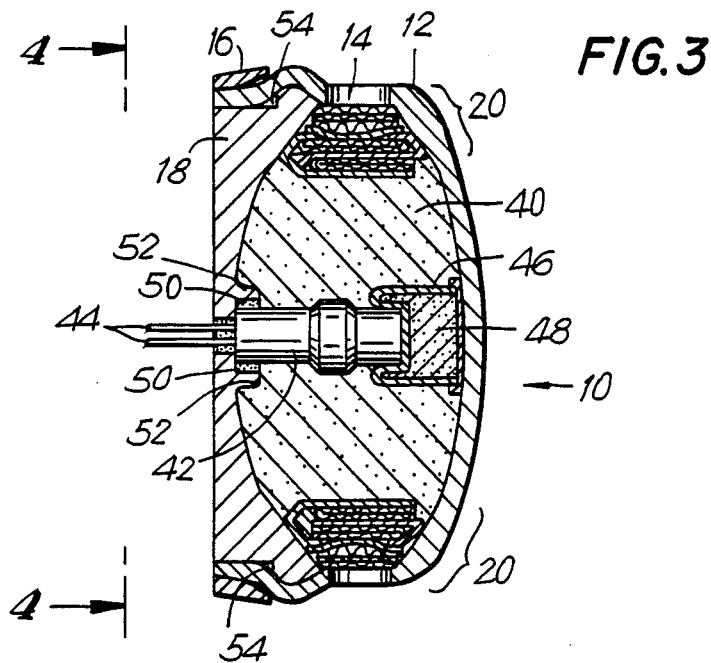
FIG. 3 is a sectional view taken along the line 3—3 of FIG. 1.

FIG. 3 illustrates a transverse sectional view through inflator 10, illustrating certain features of the unit not visible in FIG. 2. That is, the subject drawing figure illustrates features such as the means by which the combustion of pyrotechnic gas generating composition 40 is initiated. The combustion is begun through the use of, preferably, an electrically activated initiating squib 42, which contains a small charge of an electrically ignitable combustible material, connected by leads 44 to at least one remote sensing device (not shown), of a type well-known in the art. Such sensing devices may be located, for example, in the front bumper and/or, side fenders of the automobile. In inflator 10, squib 42 may, for example, be threaded through an aperture located in closure member 18 or, as in the present case, it may be "potted", i.e. glued, with the use of an epoxy 50 between two shoulders 52 formed by closure 18. Leads 44 extend outwardly from inflator 10 to connect with the remote sensing devices.

An upper portion of squib 42 abuts against enhancer packet 46, containing a quantity of a gas-generating material, such as a mixture of boron/potassium nitrate, i.e., $BKNO_3$ 48, which is preferably employed in powdered form to provide the maximum availble burning surface for the fastest possible response. Other rapidly combustible materials known to those skilled in the art may also be utilized for the same purpose but applicant has consistently obtained favorable results with the use of $BKNO_3$. In operation, upon a signal from a remote sensor (not shown), the resultant electrical discharge heats a wire strand (not shown) within squib 42 which ignites the propellant charge within the body of the squib. A stream of hot gasses produced by this combustion is then directed (due to the orientation of squib 42) into enhancer packet 46 whereupon the powdered $BKNO_3$ mixture 48 begins to burn.

While $BKNO_3$ is very successful in igniting the main propellant charge 40, it suffers from a serious deficiency in that the autoignition temperature of this material is extremely high, i.e., from about 600°–700° F. Since the compositions chosen for the main propellant charge of inflator 10 ignite at an even higher temperature in the conditions normally encountered in, for example, a car fire, the $BKNO_3$ within the unit would be at a temperature in excess of 600° F. before ignition would take place.

In such a situation, the generator housing would be subjected to even higher temperatures, i.e., in the range of from 800°–900° F., and the main propellant charge would also be at a high temperature, perhaps 400°–500° F. Under these conditions, under laws of temperature and pressure well known to those skilled in the propellant art, the propellant charge would burn very rapidly and generate gas at an extremely high pressure, thus creating a situation wherein an explosive fragmentation of the weakened generator housing becomes a distinct possibility.

It is therefore preferred to incorporate an auto-ignition material with the $BKNO_3$ within enhancer packet 44. This material is capable of autoignition at a lower temperature than $BKNO_3$. Its use would result in an ignition of the main propellant charge 40 while this charge was at a much lower temperature than that described above. Thus, the main propellant charge 40 would burn at a much lower rate and produce gas at a significantly lower pressure.

This additional "auto ignition" material is preferably a stabilized nitrocellulose composition such as IMR 4895 which autoignites at less than about 400° F. The preferred material is produced by the DuPont Corporation, but any combustible material capable of performing in this manner would be acceptable for use in the present invention.

The end effect of combining such an auto-ignition material with, for example, the $BKNO_3$ enhancer composition so as to render this mixture an integral part of applicant's ignition chain is to prevent a weakening of the generator housing, thus diminishing or altogether removing the chance of an explosive overpressurization. This removes one potential danger to passengers and/or bystanders in the event of a car fire.

The rapid generation of hot gasses produced by the combustion of the $BKNO_3$/auto-ignition composition mixture acts to burst the walls of enhancer packet 46 and impinges upon the main propellant composition 40, preferably comprising a mixture of sodium azide and at least a stoichiometric amount of a metal oxide such as copper oxide. A variety of compositions, well known to those of ordinary skill in the art, may be utilized as the main propellant charge 40 for inflator 10 described herein.

Applicant prefers, for use in the presently described generator, the various compositions described in U.S. Pat. No. 3,895,098 to John F. Pietz, issued July 15, 1975 and reissued Jan. 26, 1988 as Re. 32,584, entitled METHOD AND COMPOSITION FOR GENERATING NITROGEN GAS. The disclosure thereof is therefore incorporated herein by reference. Among the propellant compositions disclosed in the subject patent is that which comprises a mixture of sodium azide with a stoichiometric amount of copper oxide which, as noted above, is preferred.

Alternatively, compositions substituting nickel and iron oxidizers may be utilized, but these generants, although capable of a slightly higher effective gas output than the $CuO/NaN_3$ mixture described above, often require the addition of an ammonium perchlorate burn rate enhancer to reach their full potential (as disclosed in U.S. Pat. No. 4,604,151 issued on May 8, 1986 to Knowlton and Pietz, also incorporated herein by reference, entitled METHOD AND COMPOSITION FOR GENERATING NITROGEN GAS INCLUDING AMMONIUM PERCHLORATE CATALYST. Since, as discussed above, a large number of different pyrotechnic compositions are operable within inflator 10, the present invention should not be limited solely to the compositions disclosed above.

In the preferred embodiment of the present invention, the main propellant mixture 40 is formed into small pellets, approximately the size of aspirin tablets. An appropriate amount of these pellets, calculated to produce a sufficient amount of gaseous combustion product to inflate an attached air bag within 30-60 milliseconds, is placed within either a sealed plastic bag, closed with the use of either a heat sealing device or an adhesive material, or a foil packet, closed and sealed in the same manner, and placed in diffuser 12 within the propellant cavity defined by filter assembly 20.

In an alternate embodiment of the invention, the propellant composition may be molded or extruded into a single porous grain which is conformed to the size and shape of the propellant cavity. An important consideration with the use of such a grain, however, is to ensure that it has a sufficient degree of porosity so as to provide a sufficient burning surface, thus permitting the flame front to advance through the grain with sufficient speed in order to provide, within a 30-60 millisecond period, a desired volume of gas sufficient to inflate the air bag.

The plastic or foil container used to hold the propellant mixture facilitates assembly of the unit by providing a convenient pre-weighed package adapted for simple robotic insertion into the diffuser housing. The thin outer packaging creates no hindrance to the rapid expansion of the gasses produced by combustion of the propellant, i.e., it is simply blown open by the gas.

As the gas is produced due to the combustion of propellant 40, it travels in a tortuous path through filter assembly 20, wherein it is cooled and substantially all of the molten particulates are removed, prior to exiting through diffuser ports 14 and entering the air bag (not shown). As a result of following this tortuous gas path, there is thus no need to prefilter the gas prior to its passage through the filter assembly, such as must be done in many prior art inflators.

It can also be seen from FIG. 3 that annular filter assembly 20 is positioned so as to become wedged between diffuser 12 and closure member 18 upon the formation of the inflator housing. That is to say that filter assembly 20 is configured on its upper and lower surfaces, respectively, to extend outwardly at an angle of about 1½° greater than the internal contact angles of diffuser 12 and closure 18. This creates a circular line contact between filter assembly 20 with diffuser 12 (along its upper surface) and with closure member 18 (on its lower surface) around the entire circumference of filter 20. A tight seal is thus created which prevents the gas produced by the combustion of pyrotechnic mixture 40 from moving in any direction but through filter 20. Thus, when inflator 10 senses internal pressures created by the combustion of propellant composition 40, filter assembly 20 is forced outwardly, by hoop stresses produced by the combustion, further into the wedged portion of inflator 10, so as to enhance the seal around the edges of filter assembly 20.

Moreover, in the interests of obtaining the tightest possible seal between diffuser 12 and closure member 18, a resilient O-ring, preferably made of rubber, (not shown) may be positioned between the lower lip of diffuser 12 and the outer edge of closure member 18 during the magnaforming process, i.e., in the space 54. While the seal provided by the presence of the O-ring is not required to maintain the integrity of inflator 10 during the combination stage, it can be relied upon to serve as additional insurance for enhancing the seal between diffuser 12 and closure member 18.

Figure 4:
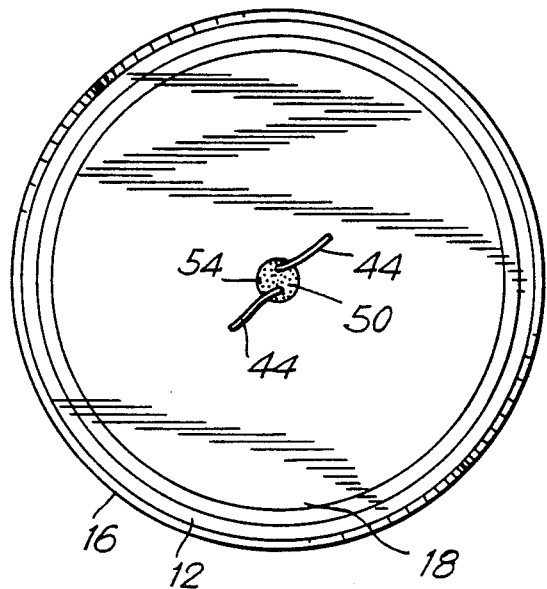
FIG. 4 is a bottom plan view of applicant's device.

FIG. 4 is a bottom plan view of inflator 10 illustrating the circumjacent relation between drive ring 16, overlapping the lip of diffuser 12, which is formed over the peripheral edge of closure member 18. As noted above, leads 44 from squib 42 extend outwardly through aperture 54 defined by closure member 18 and communicate to a remote impact-sensing device (not shown) located elsewhere on the vehicle.

Figure 5:
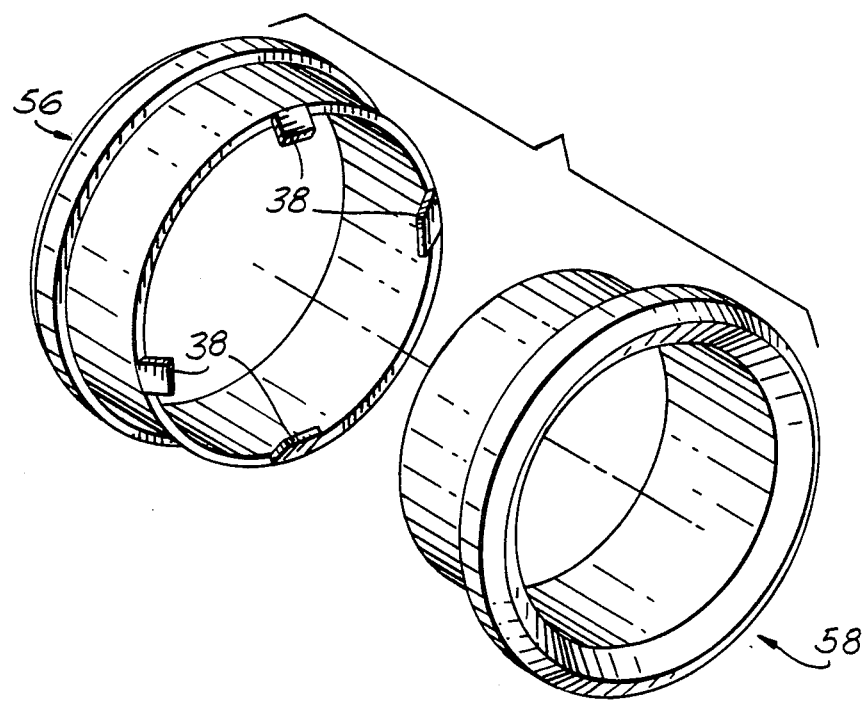
FIG. 5 is an exploded view of a frame portion of a filter assembly for use with the inflator of FIG. 1.

FIG. 5 illustrates members 56, 58 which are interlocked to form a frame for filter assembly 20. The members 56, 58 are preferably fabricated from sheet metal (e.g., aluminum) stampings in order to reduce the weight of the assembly. Tabs 38 act as spacers and maintain a degree of separation between frame members 56, 58 sufficient to permit the arrangement therebetween of the screens and inert fiber pads, described with regard to FIG. 2, which serve to filter the particulates from the gaseous combustion product and to absorb some of the heat therefrom so as to cool the gas to a temperature approaching ambient. This prevents the impingement of hot gasses and molten particulates directly against the inner surface of the bag, which would likely lead to a failure of the bag during the inflation cycle.

Figure 6:
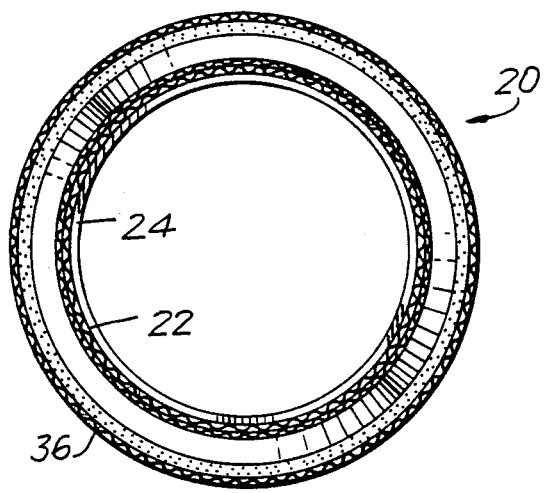
FIG. 6 is a top plan view of the subject filter assembly.

FIG. 6 is a top plan view of filter assembly 20 as it is oriented within the housing of inflator 10 when mounted upon an automobile steering column. This illustration depicts the appearance of filter assembly 20 when frame members 56, 58 are snapped together and the filtration layers of slag screen, fine screen and inert ceramic fiber are wound therearound. The assembly is preferably held together by welding the outermost mesh to both frame members, 56, 58, i.e., at the outer periphery of the frame, but alternate methods utilizing, for example, fastening means or adhesives, may also be utilized.

Figure 7:
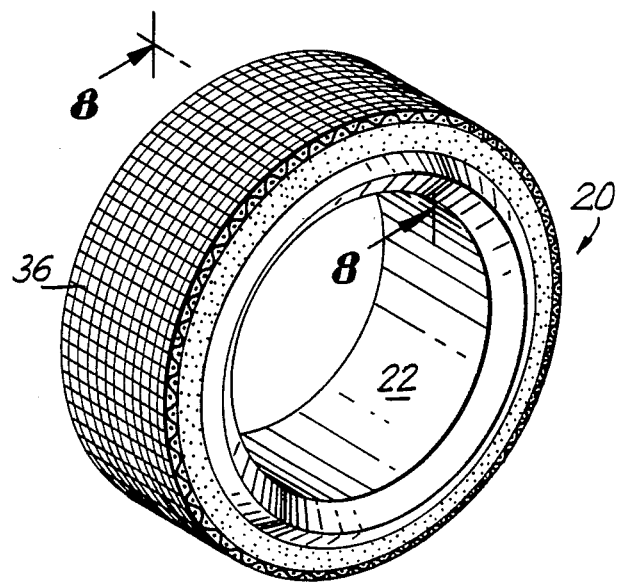
FIG. 7 is a perspective view of the filter assembly of FIG. 6.

FIG. 7 is a view of filter assembly 20 in perspective, further illustrating the annular arrangement of this component. The outermost layer of screen material 36, comprising a fine 28 mesh screen, which, when filter assembly is in position within inflator 10, abuts against the inside of diffuser ports 14, may by clearly seen. The remaining layers of screen and fiber pads lie directly underneath layer 36 in a doughnut shaped arrangement. The preferred method of sealing assembly 20 together, i.e., by welding, may also be clearly seen. The weld continues completely around both the top and bottom edges of filter assembly 20 to ensure a secure seal among the components and to prevent disassembly due to the tremendous pressures exerted during ignition of propellant composition 40.

Figure 8:
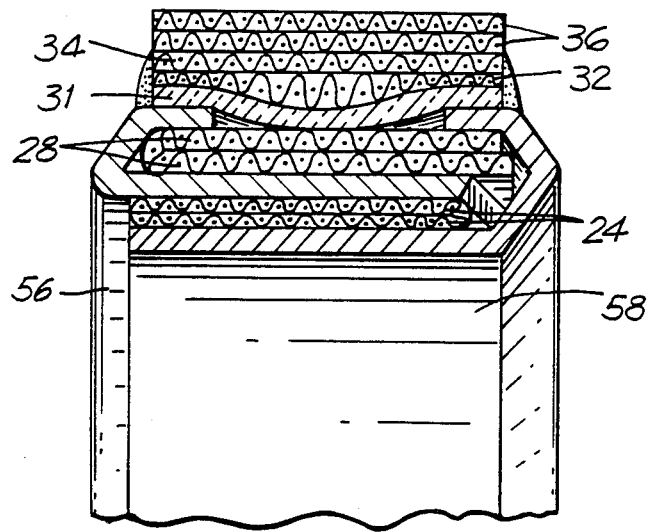
FIG. 8 is a sectional view taken along the line 8—8 of FIG. 7.

FIG. 8 depicts a lateral cross-sectional view taken through filter assembly 20, illustrating the filter layers much in the manner shown in the longitudinal section depicted in FIG. 2. Viewing the assembly from (inner) frame member 56 toward outer member 58, the gas produced by the combustion of propellant 40 travels over the top of member 56 and down through slag screens 24, around frame member 58, through slag screens 28, and thereafter through: (a) the 100 micron screen 31; (b) the fiberfrax ®pad 32; (c) a second 100micron screen 34; and (d) two layers of 28 mesh screen 36. Upon exiting from this filter assembly, substantially all of the particulate material has removed from the gas.

While it is apparent that the invention herein disclosed is well calculated to fulfill the objectives stated above, it will be appreciated that numerous modifications and embodiments may be devised by those skilled in the art. It is intended that the appended claims cover all such modifications and embodiments as fall within the true spirit and scope of the present invention.

I claim:

1. A self sealing annular filter component for operation within a housing portion of a pyrotechnic inflator device, said filter comprising:
   (a) first and second ring-shaped members configured to form annular frame means of said filter component, at least one of said ring-shaped members having at least one tab member formed integrally thereupon and extending outwardly therefrom toward said other ring-shaped member to maintain a set spacing between said ring-shaped members; and
   (b) a plurality of filtration means supported upon said filter frame means, each said filtration means positioned so as to at least partially overlap a preceding underlying one of said filtration means around an entire outer annular surface of said filter frame means,
   an entire upper and lower circumferential edge of said first and said second ring-shaped members, respectively, further being adapted for obtaining circular line contact with an inner portion of said inflator housing, thus causing said filter component to be self-sealing against said inner portion as a result of outwardly directed hoop stresses produced upon said filter component by activation of said pyrotechnic inflator, such that a gaseous combustion product produced thereby is prevented from bypassing said filter component and is therefore directed through said filtration means in a serpentine path so as to cool and filter said gas.

2. The filter of claim 1 wherein said housing portion comprises:
   (a) a domed diffuser member, having a first open end and a second closed end; and
   (b) a closure plate member sealing the open end of said diffuser member,
   said closure plate member and said domed diffuser member being sealed together without welding either of said members to form an inflator housing capable of withstanding elevated pressures produced during activation of said inflator device.

3. The filter of claim 2 wherein a peripheral lip portion on said open end of said diffuser member is sealed over an outer circumferential edge of said closure plate member by mechanical means so as to form a hermetic seal therebetween.

4. The filter of claim 3 wherein said mechanical sealing means is magnaforming.

5. The filter of claim 3 wherein said first and said second ring shaped members each comprise a metal stamping having a substantially straight wall portion with a first end and a second end and an angled flange portion, integrally formed with said first end, extending outwardly from said wall portion at an acute angle therefrom, said ring shaped members adapted for an interengaging fit therebetween to form said annular frame means.

6. The filter of claim 5 wherein said angled flange portion of each said ring shaped member extends away from its corresponding straight wall portion at an angle of about 1½° greater than an internal contact angle between said filter and, respectively, said diffuser member and said closure plate member, such that said filter is substantially wedged against said inner portion of the housing to provide a gas-tight seal therebetween upon activation of the inflator device.

7. The filter of claim 6 wherein said inflator device is operatively associated with an automobile air bag passive safety device.

8. The filter of claim 7 wherein said domed diffuser member futher comprises a plurality of diffuser ports spaced equidistantly around a circumferential peripheral portion thereof, said ports providing fluid communication between a combustion cavity defined within said inflator housing by said annular filter component and an inner portion of said automobile air bag passive safety device, to permit the deployment thereof upon activation of said inflator.

9. A self-sealing annular filter component for operation within a housing portion of a pyrotechnic inflator device, said filter comprising:
   (a) first and second ring-shaped members, each said member comprising a metal stamping having a substantially straight wall portion with a first end and a second end and an angled flange portion, integral with said first end, extending outwardly from said wall portion at an acute angle therefrom, at least one said ring-shaped member having at least one tab member formed integrally thereupon and extending outwardly therefrom toward said other ring-shaped member to maintain a set spacing between said ring-shaped members, said ring-shaped members adapted for an interengaging fit therebetween to form an annular filter frame;
   (b) a plurality of filter layers supported upon said filter frame, each said layer positioned so as to at least partially overlap a preceding underlying one of said layers around an entire annular surface of said filter frame,
   said annular filter component adapted for operation within a housing portion of a pyrotechnic inflator device, said housing portion comprising
   (a) a domed diffuser member having a first open end and a second closed end, said diffuser member defining a plurality of diffuser ports spaced equidistantly around a circumferential peripheral portion thereof, said ports providing fluid communication between a combustion cavity defined within said diffuser by said annular filter component and an inner portion of an automobile air bag operatively associated with said inflator so as to permit the deployment of said air bag upon activation of said inflator;

(b) a closure plate member sealing the open end of said diffuser member, thus forming said inflator housing;

both said diffuser member and said closure plate member formed of a relatively lightweight, corrosion-resistant, high tensile strength material, and further, said open end of said diffuser member being mechanically formed over an outer peripheral lip portion of said closure plate member to form a hermetic seal therebetween, and wherein the angled flange portion of each said ring-shaped member extends away from the corresponding straight wall portion of said member at an angle of about 1½° greater than an internal contact angle between said filter and, respectively, said diffuser member and said closure plate member in order that said filter component is substantially wedged against an inner portion of said inflator housing to provide a gas-tight seal therebetween upon activation of the inflator device.

10. The filter of claim 9 wherein said filter layers comprise at least two layers of a metal screen material having mesh size measurements different from one another and at least one layer of an inert fibrous material.

11. The filter of claim 10 wherein said inert fibrous material comprises a ceramic fiber pad, said pad interposed between at least two layers of said metal screen.

12. The filter of claim 11 wherein said ceramic fiber pad comprises a mixture of aluminum oxide and silicon oxide fibers.

13. The filter of claim 10 wherein the mesh size measurements of said at least two layers of metal screen correspondingly decrease from an inner edge adacent said combustion cavity to an outer edge abutting an inner wall portion of said inflator housing, to ensure filtration of substantially all particulate material produced upon activation of the inflator device.

14. The filter of claim 13 wherein said layer of metal screen material adjacent said outer edge thereof is secured to a corresponding adjacent edge surface of each of said ring-shaped frame members by mechanical means or adhesive means to maintain said filter layers in proper arrangement.

15. The filter of claim 14 wherein said mechanical means is a weld between said outer layer of metal screen material and said ring-shaped filter frame members.

16. The filter of claim 9 wherein said filter layers comprise, in order, from an inner edge of said filter adjacent said combustion cavity to an outer edge of said filter, abutting an inner wall portion of said inflator housing:

(a) a first layer of coarse slag screen;
(b) a second layer of coarse slag screen;
(c) a third layer of a 100 micron screen;
(d) a fourth layer of an inert ceramic pad;
(e) a fifth layer of 100 mesh screen; and
(f) a sixth layer of 28 mesh screen, each said layer substantially overlaying each preceding layer and wherein said sixth layer of said 28 mesh screen is secured to said ring-shaped filter frame member along a peripheral edge thereof to hold said filter together.

17. A method for constructing a lightweight non-welded inflator apparatus for installation in an automobile passive safety device, said method comprising:

(a) Forging a diffuser member of a material which is relatively lightweight, corrosive resistant and having a high tensile strength, said diffuser member having a first domed end and a second open end;
(b) lowering the annular filter component of claim 9 through said open end of said diffuser member and into position therein;
(c) placing a discreetly packaged propellant assembly into a combustion cavity defined by said filter component within said diffuser member;
(d) forging a substantially flat closure plate member for sealing the open end of said diffuser member;
(e) mating the closure plate member to the open end of the diffuser member; and
(f) magnaforming said diffuser member over a peripheral edge of said closure plate member to form a structural seal therebetween without welding either of said members, said seal capable of withstanding elevated pressures produced by the combustion of said propellant.

* * * * *